T. I. POTTER.
BATHING APPLIANCE.
APPLICATION FILED SEPT. 22, 1913.
1,181,406.
Patented May 2, 1916.
3 SHEETS—SHEET 1.
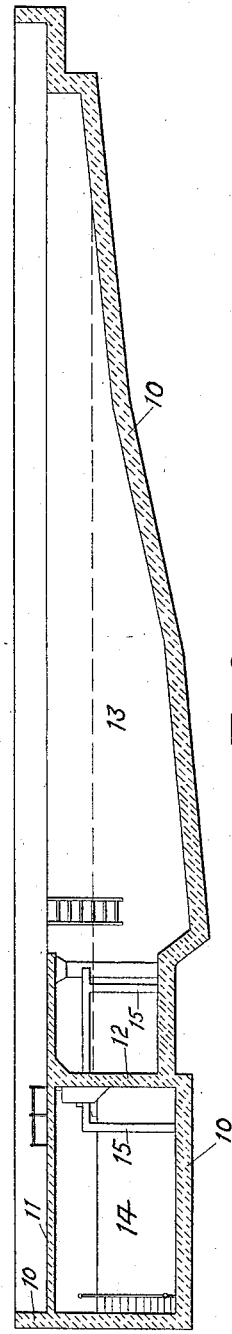
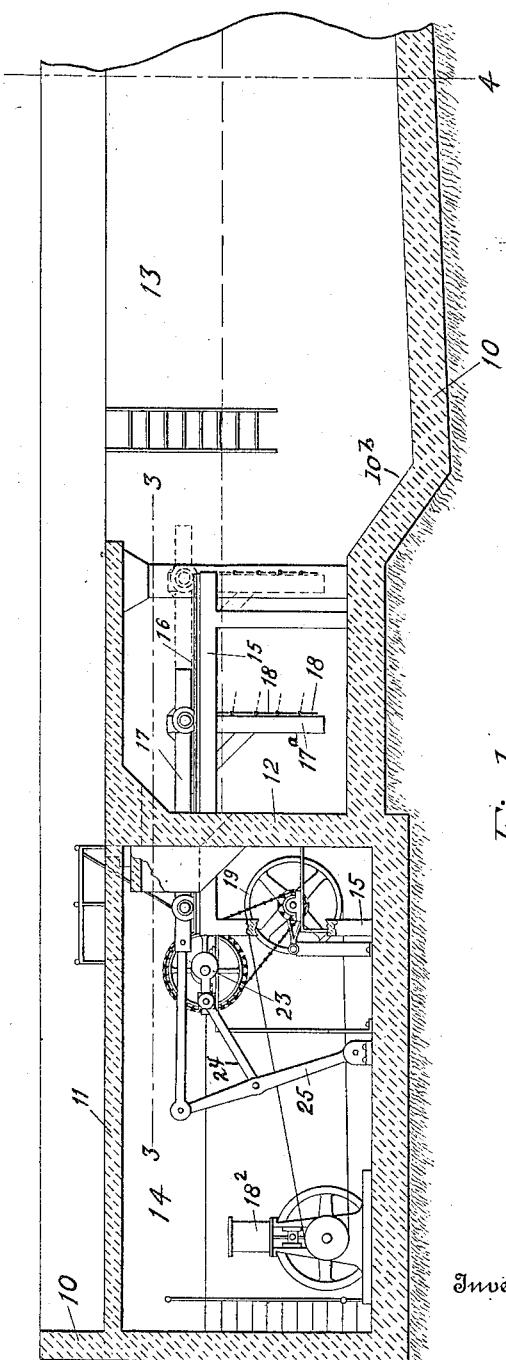

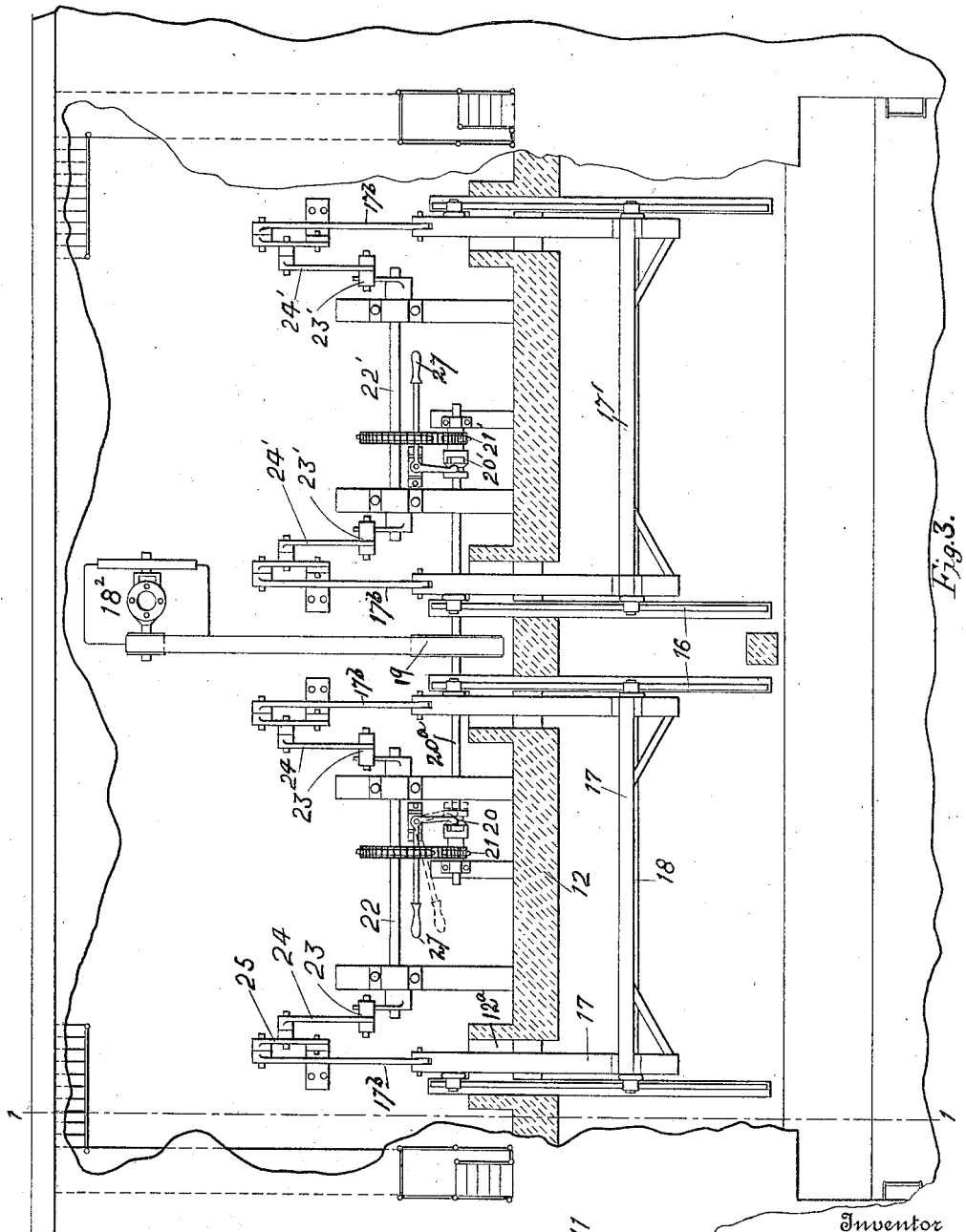

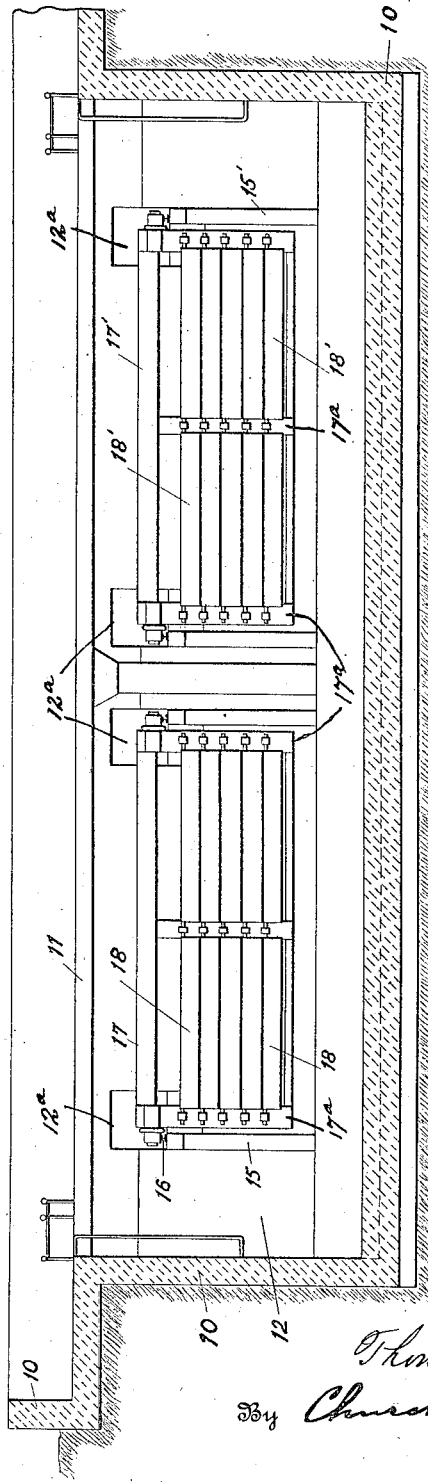

UNITED STATES PATENT OFFICE.

THOMAS IRVING POTTER, OF PORTLAND, OREGON, ASSIGNOR TO BAYOCEAN NATATORIUM COMPANY, OF PORTLAND, OREGON, A CORPORATION OF OREGON.

BATHING APPLIANCE.

1,181,406.        Specification of Letters Patent.        Patented May 2, 1916.

Application filed September 22, 1913. Serial No. 791,258.

*To all whom it may concern:*

Be it known that I, THOMAS IRVING POTTER, a citizen of the United States, residing at Portland, in the county of Multnomah and State of Oregon, have invented certain new and useful Improvements in Bathing Appliances; and I do hereby declare the following to be a full, clear, and exact description of the same, reference being had to the accompanying drawings, forming part of this specification, and to the figures and letters of reference marked thereon.

The present invention relates to bathing appliances especially designed for use in artificial tanks or bathing pools for the purpose of generating waves which will simulate the breakers and surf on an ocean beach as well as to produce other wave effects calculated to entertain and excite the interest and amusement of bathers.

The objects of the invention are to provide a simple and easily operated mechanism of such form and arrangement that it may be readily housed and concealed below the level of the top of the tank walls and which may be so operated as to produce waves having widely different characteristics, varying, for example, from the violent character of heavy breakers to the gentle lapping waves found most agreeable by the younger generation of humanity.

A further object is to provide an apparatus with the ability to produce waves having different characteristics in different portions of the tank.

Referring to the accompanying drawings,—Figure 1 is a sectional elevation through one end of a tank showing the wave generating apparatus therein, together with its operating mechanism, the section being taken substantially on the line 1—1 of Fig. 3. Fig. 2 is a sectional elevation on a reduced scale substantially corresponding to Fig. 1 but showing the entire tank and omitting the operating mechanism of the wave generator. Fig. 3 is a top plan view with the floor which overlies the operating mechanism partly broken away and in section, to disclose the mechanism below it, the plane of the section being substantially on the line 3—3 of Fig. 1. Fig. 4 is a sectional elevation substantially on the line 4—4 of Fig. 1, looking toward the left.

Like reference numbers in the several figures indicate the same parts.

The reference number 10 indicates the walls of a tank adapted for bathing purposes, such tank being preferably and as usual deep at one end and shallow at the other, so as to provide a graduated depth of water and to give full effect to the waves which are generated near the deeper end and thrown toward the shallower end of the tank. The deeper end of the tank is divided by a wall or partition 12 forming two separate chambers 13 and 14, respectively, the chamber 13 being that in which the water is located, and the chamber 14 that in which the operating mechanism for the wave generators is located. Extending over the chamber 14 and preferably also over a portion of the chamber 13 is a floor 11 which forms a platform at approximately the height of the walls of the tank for the use of the bathers or their friends and spectators.

Formed in the wall 12 are a plurality of openings 12$^a$ through which extend tracks 16 mounted on rigid frames 15, said tracks projecting into the chamber 13 a distance which is slightly less than the extension of the floor 11, so as to be concealed beneath the same. Said tracks are located above the level of the water in the tank, whereby the passage of water into the chamber 14 is prevented and the wave generating mechanism within the chamber 13 may be operated through the openings above the track. Mounted on the tracks 16 which, as shown in Fig. 3, are arranged in pairs, are reciprocatory frames or carriages 17 and 17', usually having ordinary flanged wheels or rollers traveling on the tracks, said frames being adapted to extend or travel in and out through the openings 12$^a$. At their forward ends the frames carry depending portions 17$^a$ upon which is hinged a series of swinging valves or depending vanes 18 and 18', respectively, said valves or vanes when turned down to the position shown in full lines in Fig. 1 and in Fig. 4, presenting a practically unbroken surface on their forward sides which will impel the water forwardly as the carriages are advanced, but which will turn up to the position indicated in dotted lines in Fig. 1 to permit the water to pass freely through and around the same during the return movement of the carriages.

For reciprocating the carriages 17 and 17' they are connected at their ends projecting into the chamber 14 with the upper ends of oscillatory levers 25, by connecting rods 17$^b$. The levers 25 for each carriage are connected by links or connecting rods 24 with adjustable crank arms 23 and 23' respectively on the opposite ends of shafts 22 and 22'. The shafts 22 and 22' are provided with sprocket wheels or gearing connections 21 and 21' with one member of clutches 20 and 20', said clutches being preferably on opposite ends of a drive shaft 20$^a$ which receives rotary motion from an engine or other prime mover 18$^2$ through a belt and pulley 19. The clutches 20 and 20' are adapted to be thrown into and out of engagement so as to couple the shafts 22, 22' and 20$^a$ together, by hand levers 27 of any approved type, whereby either or both of the wave generating devices may be coupled with the power shaft or allowed to remain at rest, as the case may be. The adjustable cranks 23 provide a means whereby the throw of the cranks may be varied so as to vary the reciprocation of the generator members, and in the preferred arrangement, the axis of the crank shafts 22 and 22' is above the level of the connection of the pitman 24 with the lever 25, whereby the movement of the lever 25 will be a variable movement, that is to say, it will swing in one direction at a speed greater than in the opposite direction, with the result that the movement of the wave generating members may be correspondingly varied; that is to say, they may be advanced slowly and returned quickly, or depending upon the direction of rotation of the operating shaft, the opposite effect may be produced.

By the provision of two, or a plurality of wave generating apparatus driven from a single source of power and with independent adjustable driving connections it is obvious that an infinite variety of changes may be produced in the characteristics of the waves generated. For example, by operating one only of the generators rough water may be produced on one side of the tank only, while comparative calm prevails on the other. By operating both of the generators in unison and at high speed violent and heavy waves may be produced of quite a different character from the waves produced when the generators are operated alternately, and by changing the length of the crank arms in the driving connections the stroke of the generators may be varied to produce, for example, a very gentle agitation. All of these changes may be made quickly and with a minimum experience on the part of the attendant, thus adapting the device for use at resorts or in situations where different hours of the day are set apart for bathers of different experience and age. During the children's hour the waves may be reduced in violence and character so as to give them a maximum enjoyment with a minimum danger, while during the hours devoted to experienced bathers, the apparatus may be operated to give all of the characteristics of heavy breakers on the seashore, accompanied by the usual surf.

It will be noted that the wave generating mechanism is entirely concealed at one end of the tank and does not require a superstructure above the height of the walls of the tank. The reciprocatory generators operate beneath the overhanging floor 11, where there is little or no danger of bathers becoming involved with the same or being injured thereby. In the preferred construction, as illustrated in Figs. 1 and 2, the generators operate in a portion of the tank which is slightly shallower than that portion immediately in front of the generators when at the forward extreme of their movement; that is to say, the tank deepens at the point 10$^b$ immediately in front of the wave generators, with the result that there is a minimum disturbance of the bottom strata or lower portion of the water in the tank, and consequently bathers are not annoyed by any resemblance to an undertow, the waves progressing through the upper portion of the water, without causing material travel of the water itself.

Having thus described my invention, what I claim as new and desire to secure by Letters Patent of the United States, is:

1. In a bathing appliance, the combination with a tank, a reciprocatory frame projecting through the tank wall above the water level, and a depending wave generator carried by the frame, of a power driven operating mechanism connected with the outer portion of the frame, and located below the level thereof, whereby the operating mechanism may be housed below the level of the top of the tank wall.

2. In a bathing appliance, the combination with a tank having a partition wall dividing the same into two compartments, and a platform floor covering one of said compartments and extending partly over the other compartment, of a reciprocatory wave generator mounted under the floor in the partly covered compartment and an operating mechanism for said generator located in the other compartment, and connections therewith extending through the partition walls.

3. In a bathing appliance, the combination with a tank having a gradually sloping bottom and a portion of reduced depth in proximity to the deepest end of the tank, of a reciprocatory wave generator mounted in said portion of reduced depth, and power mechanism for reciprocating said wave generator.

THOMAS IRVING POTTER.

Witnesses:
E. V. REARDON,
M. C. GEIL.

Copies of this patent may be obtained for five cents each, by addressing the "Commissioner of Patents, Washington, D. C."